(12) United States Patent
Young

(10) Patent No.: US 6,773,593 B2
(45) Date of Patent: Aug. 10, 2004

(54) CONTINUOUS FLOW REACTOR WASTEWATER TREATMENT PLANT

(76) Inventor: Richard Nils Young, 46 Brighton Rd., Atlanta, GA (US) 30309

( * ) Notice: Subject to any disclaimer, the term of this patent is extended or adjusted under 35 U.S.C. 154(b) by 281 days.

(21) Appl. No.: 10/087,692

(22) Filed: Mar. 1, 2002

(65) Prior Publication Data

US 2003/0164329 A1 Sep. 4, 2003

(51) Int. Cl.[7] .............................. C02F 3/02; C02F 3/20
(52) U.S. Cl. ....................... 210/605; 210/623; 210/803; 210/205; 210/256; 210/258; 210/525; 210/530; 210/195.3; 210/197
(58) Field of Search ................................ 210/605, 623, 210/803, 205, 256, 258, 261, 523, 525, 528, 529, 530, 532.1, 195.3, 197

(56) References Cited

U.S. PATENT DOCUMENTS

| | | | |
|---|---|---|---|
| 2,825,691 A | * | 3/1958 | Fischer ...................... 210/713 |
| 3,173,866 A | * | 3/1965 | Lefton et al. ............... 210/205 |
| 3,186,939 A | * | 6/1965 | Murray ....................... 210/626 |
| 3,521,755 A | * | 7/1970 | Bowman ..................... 210/520 |
| 3,837,493 A | * | 9/1974 | Lin ............................. 210/197 |
| 4,950,396 A | * | 8/1990 | Skaar et al. ............. 210/195.3 |
| 4,983,285 A | | 1/1991 | Nolen ......................... 210/197 |
| 5,221,470 A | | 6/1993 | McKinney ................... 210/151 |
| 5,490,935 A | | 2/1996 | Guy ............................. 210/620 |
| 5,549,818 A | | 8/1996 | McGrew, Jr. ............. 210/195.4 |
| 5,766,454 A | | 6/1998 | Cox et al. ................... 210/150 |
| 5,785,854 A | | 7/1998 | McKinney ................... 210/620 |
| 5,951,860 A | | 9/1999 | Guy ......................... 210/195.1 |
| 5,954,953 A | | 9/1999 | Guy et al. ............... 210/195.3 |
| 6,086,765 A | * | 7/2000 | Edwards ..................... 210/605 |
| 6,096,203 A | | 8/2000 | Drewery ..................... 210/170 |
| 6,200,472 B1 | | 3/2001 | Donald et al. .......... 210/195.1 |
| 6,217,761 B1 | | 4/2001 | Catanzaro et al. ....... 210/195.3 |

* cited by examiner

Primary Examiner—Frank M. Lawrence
(74) Attorney, Agent, or Firm—Needle & Rosenberg, PC

(57) ABSTRACT

A system, apparatus, and method for treating wastewater having bio-solids therein. The system includes a tank, a wastewater inlet line, an effluent discharge outlet line, and an aeration source. The tank has an upper aeration chamber and a lower clarification chamber separated by a common inclined partition having an opening defined therein. The inclined partition opens into the lower clarification chamber near a bottom of the tank which allows fluid communication between the upper aeration chamber and the lower clarification chamber. The bottom of the tank has a bio-sludge outlet for removal of settled bio-solids. The wastewater inlet line opens into the aeration chamber and an intake end of the effluent discharge outlet line is positioned within the clarification chamber. The aeration source is positioned within the aeration chamber to supply air to the wastewater within the aeration chamber.

43 Claims, 4 Drawing Sheets

CONTINUOUS FLOW REACTOR WASTEWATER TREATMENT PLANT

BACKGROUND OF THE INVENTION

1. Field of the Invention

This invention relates, generally, to systems and methods for treatment of wastewater and, more particularly, to systems and methods for continuous treatment of influent wastewater in a single tank.

2. Prior Art

Numerous devices are known in the art for the treatment of wastewater. Most treatment systems have at least two separate tanks: a treatment tank for aeration of the wastewater, and a settling tank for removing bio-solids. An inlet in communication with the treatment tank, an outlet in communication with the settling tank, and a conduit in communication with the treatment tank and the settling tank are normally provided in the wastewater systems. Influent is fed to the treatment tank via the inlet and treated wastewater is removed from the treatment system via the outlet.

In the treatment tank, oxygen is typically provided to the microbes to aerobically oxidize the organic pollutants in the wastewater. Typically, air may be injected into the treatment tank at various locations via an aeration source, such as an aerator, so that a sufficient amount of oxygen is transferred and distributed throughout the treatment tank to support the aerobic bio-activity. Typically, the aerator is a conventional design, such as, for example, a fine bubble diffuser, a coarse bubble diffuser, a jet aerator, an inductor aerator, a low speed mechanical aerator, a high speed aerator, and the like. The treatment tank tends to be a fairly high energy environment to keep microbial solids suspended (i.e., mixed) and to supply the mixture with the appropriate level of oxygen.

The aerobically treated wastewater is generally delivered to the settling tank via at least one conduit extending therebetween. Typically, a gravity flow conduit or a pressurized conduit delivers the aerobically treated wastewater to the settling tank. To allow the bio-solids present in the wastewater to settle, the settling tank typically is designed as a generally low energy, quiescent, environment. Treated wastewater is removed from the settling tank through the outlet.

As noted above, the general state of the art is to employ a separate tank for each sequential phase of the treatment cycle. That is, to use at least one treatment tank for aerobic bio-treatment, and to use at least one settling tank for settling of bio-solids. The disadvantages to the use of separate tanks include the greater use of land and the additional cost of building two tanks and the plumbing to connect the two tanks. Various designs of single tank wastewater treatment systems have been proposed to overcome the noted disadvantages.

One common type of a single tank wastewater treatment system incorporates both a clarifier chamber and treatment chamber into a single tank. A partition is typically provided within the tank to create the two chambers, a lower aeration chamber and an upper clarification chamber. The partition does not extend to the floor of the tank and defines an opening so that the two chambers can be in fluid communication. Examples of such wastewater treatment systems are shown in U.S. Pat. No. 6,096,203 to Drewery, U.S. Pat. No. 5,785,854 to McKinney, U.S. Pat. No. 5,549,818 to McGrew, U.S. Pat. No. 5,490,935 to Guy, U.S. Pat. No. 5,221,470 to McKinney, and U.S. Pat. No. 4,983,285 to Nolen. The wastewater treatment systems described in the exemplary patents can adequately be characterized as aerated septic tanks and are generally small, with a capacity typically less than 2500 gallons. Such aerated septic tank systems are suitable for only very low volumes of wastewater, with flow rates ranging from only 500 to 1,500 gallons per day.

An alternative example of a single tank wastewater system is demonstrated in sequencing batch reactor (SBR) wastewater treatment systems. SBR wastewater treatment systems typically use only one tank in which aeration and clarification are achieved by alternatively aerating a batch of wastewater in the tank, during a reaction phase, then turning off the aerator to allow the bio-solids to settle, in a clarifying phase, so that clear, treated effluent forms above the bio-sludge blanket formed by the settled bio-solids. During the clarifying phase no liquids enter or leave the tank to avoid the introduction of turbulence in the supernatant. After settling, in a decanting phase, treated effluent is withdrawn from below the surface of the mixed liquor to avoid disturbing the settled bio-sludge. The tank is then refilled and the reaction phase is reinitiated. By definition, SBRs process intermittently so they are only suitable for very low volumes of wastewater. To overcome the low volume limitation, SBRs often use two tanks so that one tank is being aerated while the other is settling. To function properly, SBRs require the use of programmed timers and pumps to properly control the sequential processes that take place in the single tank, and, if used, to alternate the processes between the two tanks.

SUMMARY

The present invention overcomes the prior art limitations by providing a system and method which is highly reliable, relatively economical in manufacture, cost effective in installation, and allows for relatively high flow rates of treated wastewater.

In one exemplary embodiment, the wastewater treatment system includes a treatment tank having an internal partition, a wastewater inlet line, an effluent discharge outlet line, and an aeration source. The partition is connected to a side wall of the tank intermediate the bottom and the top of the treatment tank and divides the tank into an upper aeration chamber and a lower clarification chamber. The partition defines an opening that is spaced from the bottom of the treatment tank which allows for fluid communication between the upper aeration chamber and the lower clarification chamber. In one example, the partition may have, in portion, an inverted frustoconical shape.

The wastewater inlet line opens into and is in fluid communication with the aeration chamber of the treatment tank. The effluent discharge outlet line is in fluid communication with the clarification chamber for communication of treated wastewater away from the treatment tank. The aeration source is positioned within the aeration chamber to supply oxygen to the wastewater in the aeration chamber. The aeration source in the aeration chamber provides mixing of the wastewater within the aeration chamber and supplies oxygen to the mixed liquor in the aeration chamber for efficient removal of organic pollutants.

The treatment tank may also include a second partition that is connected to portions of the side wall of the treatment tank. In position, a top edge of the second partition is proximate the peripheral edge of the treatment tank and a bottom edge is spaced from an upper surface of the partition that divides the treatment tank into the upper aeration chamber and the lower clarification chamber. The second partition forms a separate anoxic chamber within the aeration chamber of the treatment tank. In one example, the wastewater inlet line opens into the anoxic chamber of the treatment tank. The tank may also include a bio-sludge recirculation conduit in communication with a bio-sludge outlet in the bottom of the treatment tank and in communication with the anoxic chamber for supplying bio-sludge from the clarification chamber to the anoxic chamber of the tank.

BRIEF DESCRIPTION OF THE DRAWINGS

The accompanying drawings, which are incorporated in and constitute a part of this specification, illustrate several embodiments of the invention and together with the description, serve to explain the principals of the invention.

DETAILED DESCRIPTION OF THE INVENTION

Figure 1:
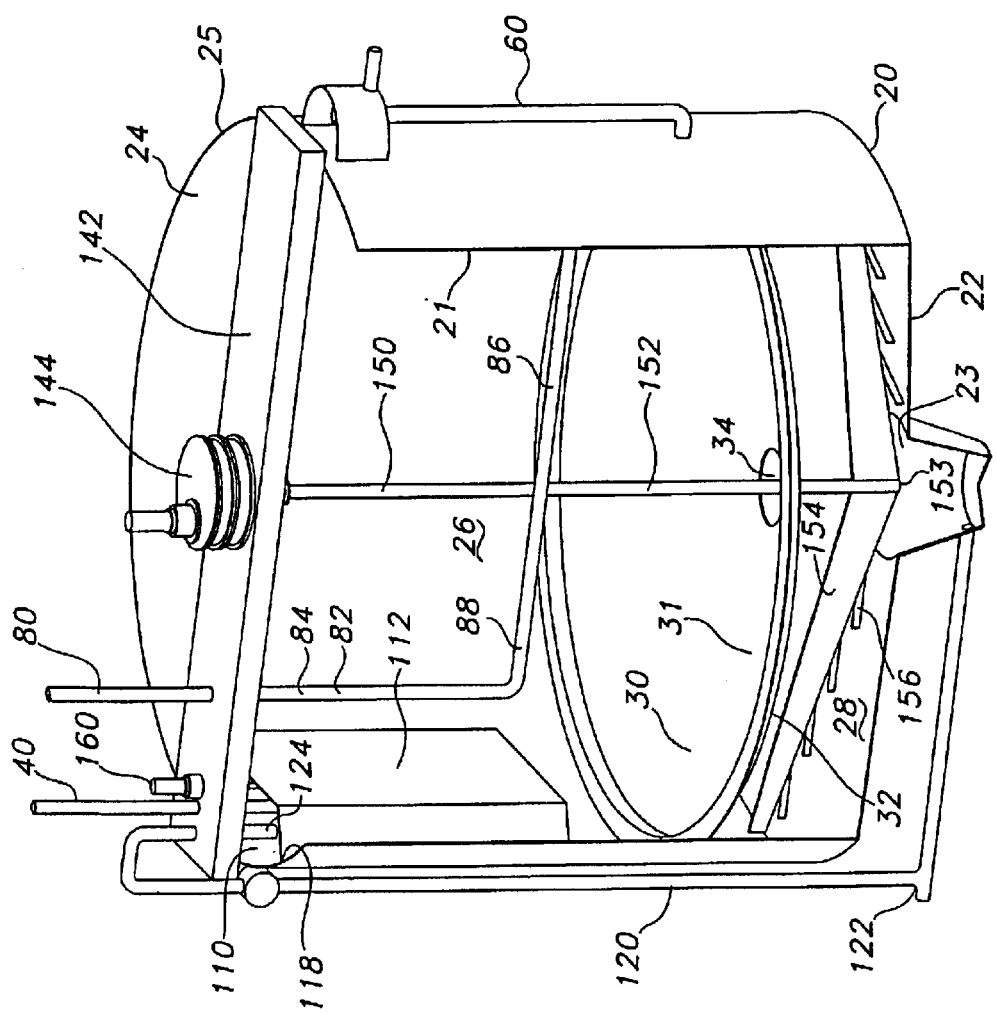
FIG. 1 is a cut-away perspective view of an embodiment of the wastewater treatment system.

The present invention is more particularly described in the following examples that are intended to be illustrative only since numerous modifications and variations therein will be apparent to those skilled in the art. As used in the specification and in the claims, the singular form "a," "an" and "the" include plural referents unless the context clearly dictates otherwise.

Referring to the figures, the wastewater treatment system 10 of the present invention may include a tank 20, a wastewater inlet line 40, an effluent discharge outlet line 60, and an aeration source 80. The tank 20 has a bottom 22, an open top 24, an upper aeration chamber 26, and a lower clarification chamber 28. The bottom 22 of the tank 20 has a bio-sludge outlet 23 and the top 24 has a peripheral edge 25 extending along the periphery of the tank 20. The tank 20 may, for example, have a cylindrical shape.

A common partition 30 is connected to a continuous side wall 21 of the tank intermediate the bottom 22 and the top 24 of the tank 20 and divides the tank 20 into the upper aeration chamber 26 and the lower clarification chamber 28. The partition 30 has an upper surface 31, a lower surface 32, and defines an opening 34 extending through the partition 30. The partition 30 is spaced from the bottom 22 of the tank 20. As one would appreciate, the opening 34 in the common partition 30 is also spaced from the bottom 22 of the tank 20 and allows for fluid communication between the upper aeration chamber 26 and the lower clarification chamber 28. Preferably, at least a portion of the common partition 30 is inclined toward the bottom 22 of the tank 20 so that the opening 34 in the common partition 30 opens into the lower clarification chamber 28 near the bottom 22 of the tank 20. In one example, the common partition 30 has, at least in portion, an inverted frustoconical shape and the opening 34 in the partition is typically defined at the apex of the frustoconical shape.

It is preferred that the bio-sludge outlet 23 be proximate a center of the bottom 22 of the treatment tank 20. The bottom 22 of the tank 20 may have, at least in portion, an inverted frustoconical shape. In this example, the bio-sludge outlet 23 is preferably positioned proximate the apex of the frustoconical shape of the bottom 22 so that, in operation, bio-sludge, formed on the bottom 22 of the tank 20 by the biosolids settling out of the wastewater within the clarification chamber 28 will tend to migrate toward the bio-sludge outlet 23 of the tank 20 under the influence of gravity.

The wastewater inlet line 40 opens into, and is in fluid communication with, the aeration chamber 26 of the treatment tank 20. The effluent discharge outlet line 60 is in fluid communication with the clarification chamber 28. In one example, an inlet end 62 of the effluent discharge outlet line 60 is positioned within the clarification chamber 28 and an outlet end 64 of the effluent discharge outlet line 60 is positioned external of the interior of the tank 20. In one example, the intake end 62 of the effluent discharge outlet line 60 extends through the side wall 21 of the tank 20 and is positioned proximate to and below the lower surface 32 of the common partition 30. Thus, the intake end 62 of the discharge outlet line 60 is positioned relative to the bottom 22 of the tank 20 so that the intake end 62 is spaced from the bio-sludge blanket formed from the settled bio-solids deposited on the bottom 22 of the tank 20. With the intake end 64 in this preferred position, bio-sludge is prevented from being drawn into the intake end 64 of the effluent discharge outlet line 60 as treated wastewater is withdrawn from the clarification chamber 28.

The aeration source 80 is positioned within the aeration chamber 26 to supply oxygen to the wastewater held therein. The aeration source supplies oxygen to the mixed liquor in the aeration chamber, which, because of the increase in the oxygenation level, provides an environment conducive for aerobic treatment of the wastewater. In operation, the aeration chamber 26 is a generally high energy environment so that the wastewater within the aeration chamber 26 is adequately mixed by the turbulence supplied by the aeration source 80 and the mixed liquor is exposed to adequate levels of oxygen to effect removal of organic pollutants.

As one skilled in the art will appreciate, the aeration source 80 is typically an aerator 82. Many examples of conventional aerators are known that can be positioned in the aeration chamber 26 to provide the desired levels of mixing and oxygen dissolution. These examples include, but are not limited to, a fine bubble diffuser, a course bubble diffuser, a jet aerator, an inductor aerator, a low speed mechanical aerator, and a high speed mechanical aerator.

Figure 2:
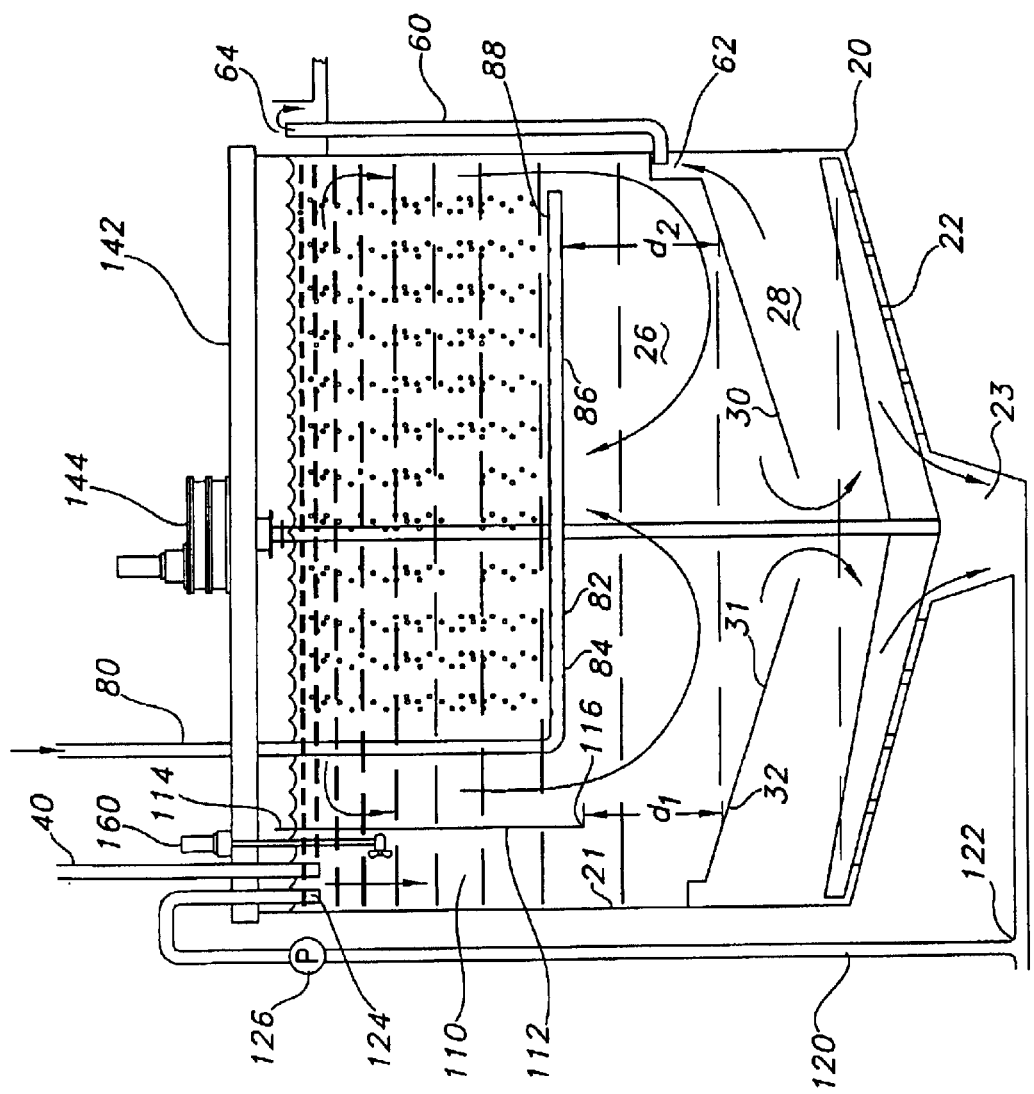
FIG. 2 is a sectional view of the invention shown in FIG. 1 taken in a vertical plane which bisects the exemplified embodiment of the wastewater treatment system.

Referring to FIGS. 1 and 2, an example of the present invention is shown with an exemplified course bubble diffuser 84 positioned in the aeration chamber 26 of the tank 20. The diffuser 84 preferably has at least one air outlet pipe 86 connected to an external compressed oxygenation gas source, such as, for example, an air blower. In this example, a portion of the air outlet pipe 86 extends from the exterior of the tank 20 into the aeration chamber 26 and is positioned so that at least a portion of the air outlet pipe 86 is spaced from the upper surface 31 of the common partition 30. As one skilled in the art will appreciate, the end of the air outlet pipe 86 may be open or closed. A portion of the air outlet pipe defines a plurality of openings 88, such as slots or holes, which run up the side of the air outlet pipe 86 near the end of the air outlet pipe 86. The purpose of the openings 88 is to allow for uniform aeration and mixing of the aeration chamber 26. The release of air into the aeration chamber 26 via the openings 88 in the air outlet pipe 86 introduces a turbulent current in the aeration chamber 26 for mixing while providing a sufficient supply of oxygen for the growth of the aerobic bacteria.

Figure 3:
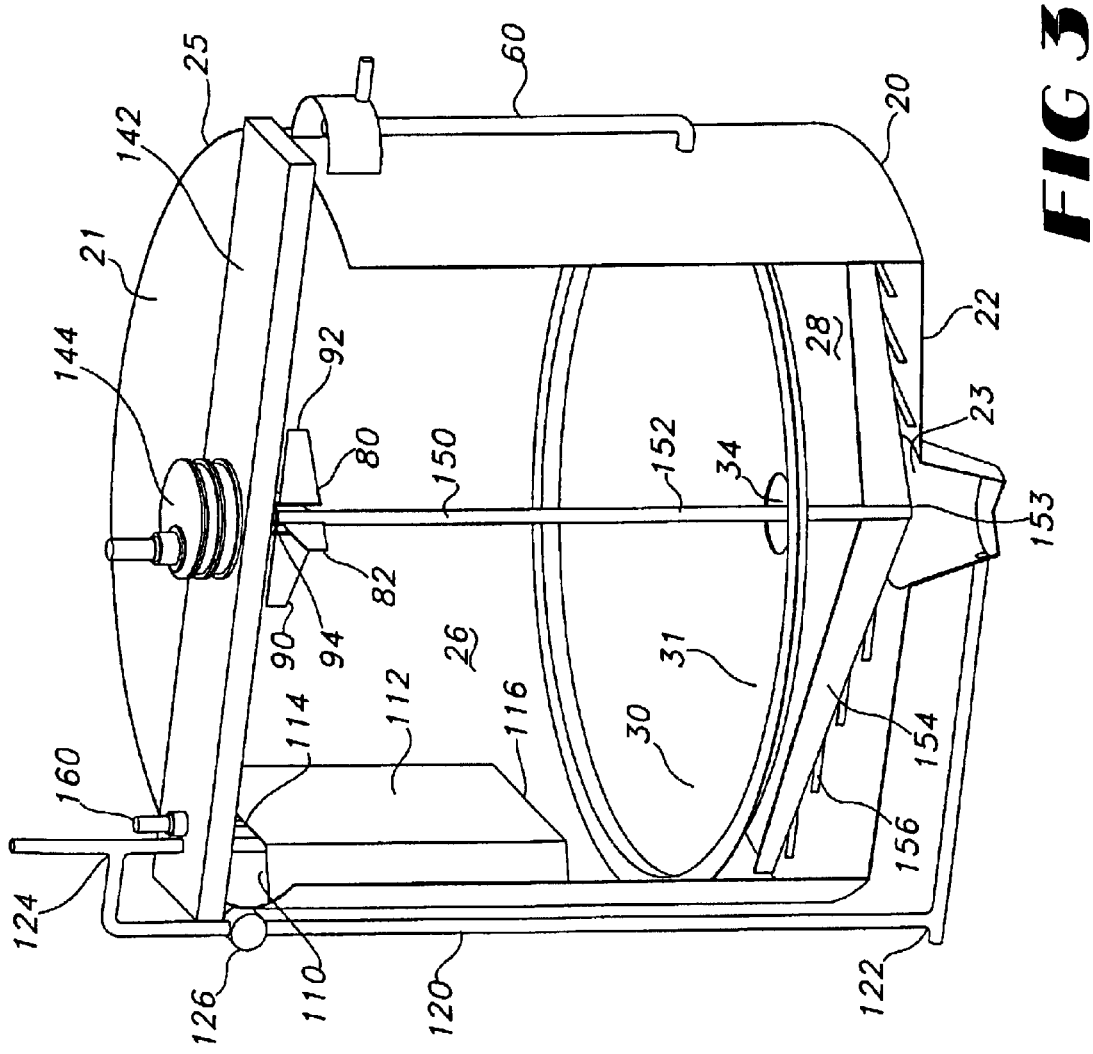
FIG. 3 is a cut-away perspective view of an alternate embodiment of the wastewater treatment system.
Figure 4:
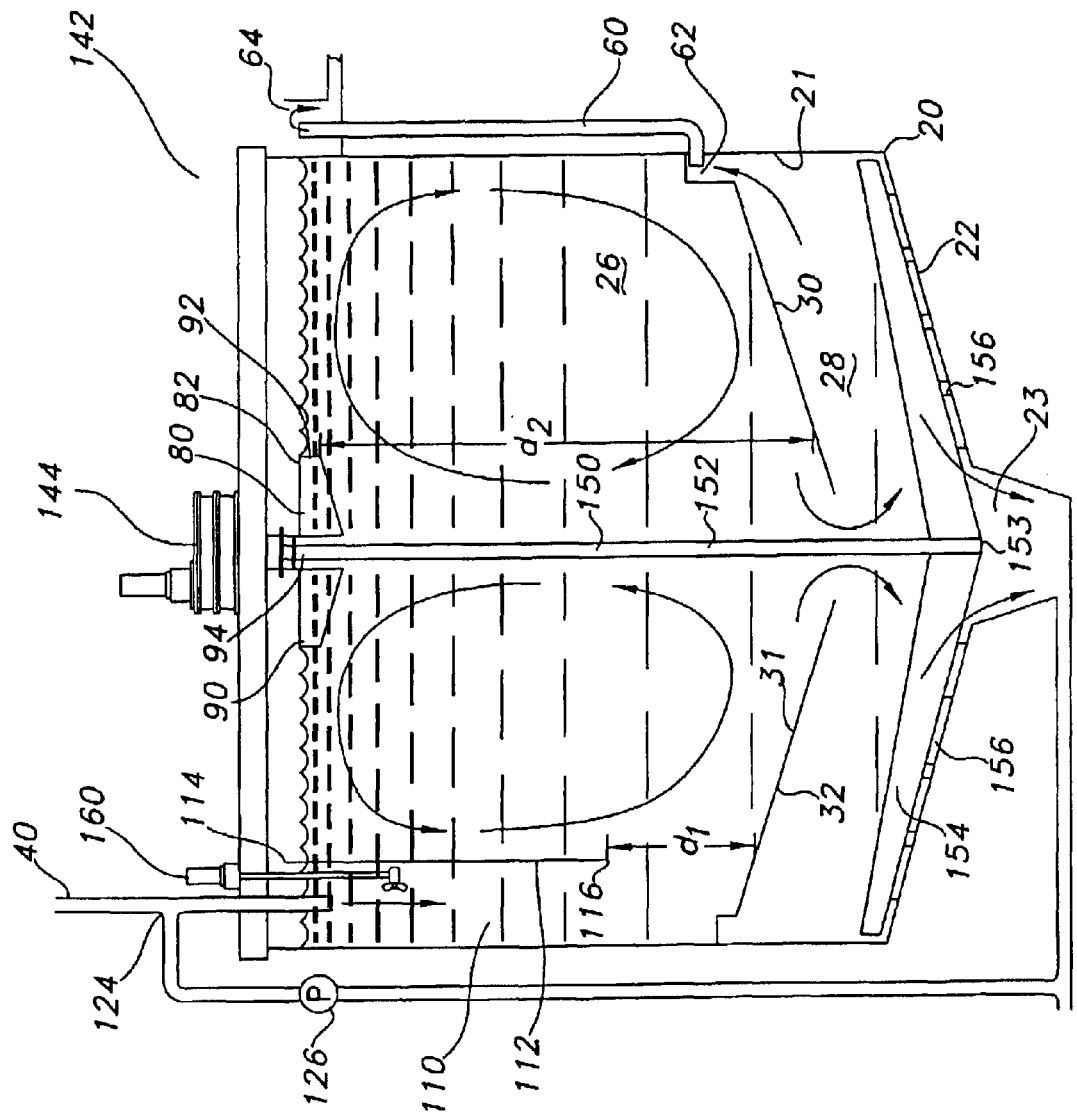
FIG. 4 is a sectional view of the invention shown in FIG. 3 taken in a vertical plane which bisects the exemplified embodiment of the wastewater treatment system.

In another example of the invention as shown in FIGS. 3 and 4, a mechanical aerator 90 is in communication with the wastewater of the aeration chamber 26. In this example, the mechanical aerator 90 has at least one blade 92 coupled to, and extending generally radially from, a drive shaft 94. As one would appreciate, the drive shaft 94 is driven by a conventional drive assembly that is disposed with respect to the open top 24 of the treatment tank 20. In operation, the rotation of the blade 92 of the mechanical aerator 90 within the aeration chamber 26 induces the desired turbulence in the mixed liquor for mixing and transfers oxygen into the aeration chamber 26.

To include the capability for denitrification in the wastewater treatment system of the present invention, the system may also include an anoxic chamber 110 defined within the aeration chamber 26 of the tank 20 by a second common partition 112. The second common partition 112 has a top edge 114, a spaced bottom edge 116, and a pair of opposing side edges 118 that extend from the top edge 114 to the bottom edge 116 of the second common partition 112. In one example, the side edges 118 of the second common partition 112 are connected to portions of the side walls 21 of the tank 20 so that the top edge 114 of the second common partition 112 is proximate the peripheral edge 25 of the tank 20 and the bottom edge 116 of the second common partition 112 is spaced from the upper surface 31 of the common partition 30 separating the upper aeration chamber 26 and the lower clarification chamber 28. The second common partition 112 is preferably substantially upright.

As one will appreciate, since the anoxic chamber 110 is positioned within the aeration chamber 26 of the tank 20, the anoxic chamber 110 and the aeration chamber 26 are in fluid communication with each other. However, unlike the relatively high energy environment of the aeration chamber 26, the second common partition 112 forms a barrier that generally shields the anoxic chamber 110 from the turbulence and oxygenation effects of the aeration source 80. Thus, the anoxic chamber 110 forms a zone that tends to be oxygen deficient, which promotes anoxic degradation of nitrates in the wastewater. During the denitrification process, anoxic degradation of nitrates results in the generation of nitrogen gas. Anoxic treatment in a wastewater treatment system is desirable, as it assists in promoting a more complete biological degradation.

To aid in minimizing the effects of the aeration source 80 on the anoxic chamber 110, the bottom edge 116 of the second common partition 112 is preferably spaced from the upper surface 31 of the common partition 30 a first distance $d_1$ and the aeration source 80 is spaced from the upper surface 31 of the common partition 30 a second distance $d_2$. The second distance $d_2$ is preferably greater than the first distance $d_1$ so that the bottom edge 116 of the second common partition 112 extends generally below the aeration source 80.

In one example, the wastewater inlet line 40 may open into the anoxic chamber 110 so that the wastewater is first subjected to anoxic treatment in the anoxic chamber 110 prior to passing into the aeration chamber 26. Referring to FIGS. 1 and 2, the system 10 may also include a bio-sludge recirculation line 120. The bio-sludge recirculation line 120 has a first end 122 in fluid communication with the bio-sludge outlet 23 and a second end 124 in fluid communication with the anoxic chamber 110. A pump 126, for example, an air lift pump, is operably coupled to the bio-sludge recirculation line 120 so that bio-sludge removed from the clarification chamber 28 of the tank 20 via the bio-sludge outlet 23 may be metered though the bio-sludge recirculation line 120 and into the anoxic chamber 110 of the tank 20.

In another example, shown in FIGS. 3 and 4, the second end 124 of the bio-sludge recirculation conduit 120 may be connected to the wastewater inlet line 40 at a juncture removed from the outlet of the wastewater inlet line 40. In this example, the wastewater inlet line 40 is positioned so that it opens into the anoxic chamber of the tank 20.

In yet another example, the portion of the wastewater inlet line 40 extending from the juncture of the bio-sludge recirculation line 120 to the outlet of the wastewater inlet line 40 is sized to act as a relatively low energy anoxic treatment chamber. Thus, in this alternate example, the wastewater exiting the outlet of the wastewater inlet line 40 undergoes anoxic treatment in a portion of the wastewater inlet line 40 proximate the outlet and may be deposited directly into the aeration chamber 26. As one will appreciate, the second common partition 112 which defines the anoxic chamber 110 within the aeration chamber 26 is not needed in this example.

The wastewater treatment system may also include a mixer 160 positioned so that a portion is disposed in the anoxic chamber in contact with the materials contained therein. The mixer generally operates at a speed sufficient to provide a gentle mixing action and assure contact between the influent wastewater and the recycled bio-solids from the bio-sludge recirculation line 120.

The present invention may also include a bio-sludge removal subsystem 140 for removing accumulating bio-sludge from the bottom 22 of the treatment tank 20. As one skilled in the art will appreciate, the bio-sludge removal subsystem 140 is entirely optional as the exemplified wastewater treatment system can utilize gravity as the motivating force for urging the bio-sludge toward the bio-sludge outlet 23. For example, the bio-sludge removal system 140 may include a bridge member 142, a conventional drive mechanism 144, and a driven assembly 150. The bridge member 142 is disposed on portions of the peripheral edge 25 of the tank 20 so that the bridge member 142 spans the open top 24 of the tank 20. The bridge member 142 preferably is positioned so that it substantially bisects the open top 24 to the tank 20. Thus, a portion of the bridge member 142 may extend over the proximate center of the open top 24. The drive mechanism 144 is supported by and is coupled to the bridge member 142 proximate the center of the top 24 of the tank 20.

The driven assembly 150 is operatively coupled to the drive mechanism 144 and will typically include a downwardly extending shaft 152, at least one rake arm 154, and at least one scraper blade 156. In the present invention, the shaft 152 extends through the opening 34 in the common partition 30 so that a distal end 153 of the shaft 152 is spaced from the bottom 22 of the tank 20. The rake arm 154 is connected to the shaft 152 near the distal end 153 of the shaft 152 and extends generally radially from the shaft 152. The rake arm 154 is spaced from the bottom 22 of the tank 20. At least one scraper blade 156 is connected to and depends from the rake arm 154 for close sliding contact with at least a portion of the bottom 22 of the tank 20. In operation, the rotation of the shaft 152 causes the scraper blade 156 to urge accumulated bio-sludge from the bottom 22 of the tank 20 toward the bio-sludge outlet 23 in the bottom 22 of the tank 20. As one will appreciate, if a mechanical aerator is used in the system 10, the drive shaft 94 and the shaft 152 for the bio-sludge removal subsystem may be the same shaft.

In operation, wastewater is supplied to the aeration chamber 26 via the wastewater inlet line 40. An oxygen bearing gas, such as air, is supplied to the aeration chamber 26 via the aeration source 80 so that the oxygen content of the wastewater in the aeration chamber 26 is increased and the suspended bio-solids in the wastewater are adequately mixed to effect efficient removal of organic pollutants in the aeration chamber 26. The aerobically treated wastewater passes through the opening 34 in the common partition 30 and into the clarification chamber 28. In the clarification chamber 28, bio-solids in the wastewater settle onto the bottom 22 of the tank 20 to form a bio-sludge layer. The treated wastewater is removed from the clarification chamber 28 via the effluent discharge line without disturbing the bio-sludge layer. Finally, the bio-sludge is removed from the tank 20 via the bio-sludge outlet 23 in the bottom 22 of the tank 20. As one will appreciate, the tank 20 is capable of processing a continual flow of wastewater, and can thus process high flow rates of wastewater. For example, a tank 20 having a diameter of approximately 50 feet may be able to process in excess of 1,000,000 GPD. The larger the tank, the larger the treatable flow rate.

Further, if the tank 20 includes the anoxic chamber 110, the wastewater is preferably initially supplied to the anoxic chamber 110 for anoxic treatment of the wastewater prior to the introduction of the wastewater into the aeration chamber 26. Bio-sludge removed from the clarification chamber 28 of the tank 20 may be pumped into the anoxic chamber 110 along with the supplied wastewater.

The invention has been described herein in detail, in order to comply with the Patent Statutes and to provide those skilled in the art with information needed to apply the novel principles, and to construct and use such specialized components as are required. However, it is to be understood, by those skilled in the art, that the invention can be carried out by specifically different equipment and devices, and that various modifications, both as to equipment details and operating procedures can be affected without departing from the scope of the invention itself. Further, it should be understood that, although the present invention has been described with reference to specific details of certain embodiments thereof, it is not intended that such details should be regarded as limitations upon the scope of the invention except as and to the extent that they are included in the accompanying claims.

What is claimed is:

1. A method for treating wastewater comprising:
   providing a tank having a bottom, an upper aeration chamber, and a lower clarification chamber, the aeration chamber separated from the clarification chamber by a common inclined partition having an opening defined therein, the partition opening into the clarification chamber near the bottom of the tank allowing fluid communication between the aeration chamber and the clarification chamber, the bottom of the tank having a bio-sludge outlet in communication with the clarification chamber;
   suppling wastewater to the aeration chamber;
   aerating the wastewater within the aeration chamber;
   passing aerated wastewater though the inclined partition opening and into the clarification chamber;
   settling bio-solids within the clarification chamber to the bottom of the tank;
   removing effluent from the clarification chamber of the tank; and
   removing settled bio-solids from the clarification chamber of the tank via the bio-sludge outlet of the tank.

2. The method of claim 1, further comprising:
   providing an anoxic chamber within the aeration chamber, the anoxic chamber defined by a second common partition having a top edge, an opposite bottom edge, and a pair of opposing side edges extending from the top edge to the bottom edge thereof, the side edges of the second partition connected to portions of a side wall of the tank so that the top edge is proximate a peripheral edge of the tank and the bottom edge of the second partition is spaced from an upper surface of the inclined partition; and
   supplying wastewater to the anoxic chamber.

3. The method of claim 2, further comprising recirculating a portion of the removed settled bio-solids from the clarification chamber thereinto the anoxic chamber.

4. A wastewater treatment tank having a bottom, an open top, and a continuous side wall extending between the top and the bottom, the bottom of the treatment tank having a bio-sludge outlet, the tank comprising:
   an inverted frustoconical partition connected to the side wall of the treatment tank intermediate the bottom and the top thereof, the partition having an upper surface, a lower surface, and an opening defined therein and spaced from the bottom of the tank, the partition dividing the treatment tank into an upper aeration chamber and a lower clarification chamber;
   a wastewater inlet line opening into the aeration chamber of the treatment tank;
   an effluent discharge outlet line having an intake end positioned within the clarification chamber and an outlet end external of the tank; and
   an aerator positioned within the aeration chamber to supply air to the wastewater within the aeration chamber.

5. The tank of claim 4, wherein the bottom of the treatment tank is formed to have an inverted frustoconical shape.

6. The tank of claim 4, wherein the bio-sludge outlet is proximate a center of the bottom of the treatment tank.

7. The tank of claim 4, wherein the intake end of the effluent discharge outlet line is positioned proximate to and below the lower surface of the partition.

8. The tank of claim 4, wherein the treatment tank is cylindrical and wherein the top of the tank has a peripheral edge.

9. The tank of claim 8, further comprising:
   a bridge member supported on the peripheral edge of the treatment tank;
   a drive mechanism supported by the bridge;
   a driven assembly coupled to the drive mechanism that includes:
     a vertically extending shaft having a distal end, the shaft extending through the opening in the partition such that the distal end of the shaft is spaced from the bottom of the treatment tank; and
     at least one rake arm extending generally radially from proximate the distal end of the shaft.

10. The tank of claim 9, further comprising at least one scraper blade depending from the rake arm for close sliding contact with at least a portion of the bottom of the tank.

11. The tank of claim 4, further comprising a second partition having a top edge, an opposite bottom edge, and a pair of opposing side edges extending from the top edge to the bottom edge thereof, the side edges of the second partition connected to portions of the side wall of the treatment tank so that the top edge of the second partition is proximate a peripheral edge of the treatment tank and the bottom edge of the second partition is spaced from the upper surface of the frustoconical partition, wherein the second partition forms an anoxic chamber within the aeration chamber of the treatment tank.

12. The tank of claim 11, wherein the bottom edge of the second partition is spaced from the upper surface of the common partition a first distance and the aerator is spaced from the upper surface of the common partition a second distance, and wherein the second distance is greater than the first distance so that the bottom edge of the second partition extends below the aerator.

13. The tank of claim 11, wherein the wastewater inlet line opens into the anoxic chamber of the treatment tank.

14. The tank of claim 13, further comprising:
a bio-sludge recirculation conduit having a first end in communication with the bio-sludge outlet and a second end in communication with the anoxic chamber; and
a pump operably connected to the bio-sludge recirculation conduit so that bio-sludge from the clarification chamber of the treatment tank is passed into the anoxic chamber.

15. The tank of claim 14, wherein the bio-sludge recirculation conduit is in fluid communication with the wastewater inlet line.

16. The tank of claim 4, wherein the aerator is selected from a group consisting of a fine bubble diffuser, a coarse bubble diffuser, a jet aerator, an inductor aerator, a low speed mechanical aerator, a high speed mechanical aerator, and combinations thereof.

17. An apparatus for treating wastewater comprising:
a tank having a bottom, an open top, and a continuous side wall extending between the top and the bottom, the bottom of the treatment tank having a bio-sludge outlet, the top of the tank having a peripheral edge;
an inverted inclined partition connected to the side wall of the treatment tank and spaced from the bottom of the treatment tank, the inclined partition having an upper surface, a lower surface, and an opening defined therein, the side wall of the tank and the upper surface of the inclined partition defining an upper aeration chamber, the side wall of the tank, the lower surface of the inclined partition, and the bottom of the tank defining a lower clarification chamber;
a wastewater inlet line opening into the aeration chamber;
an effluent discharge outlet line having an intake end positioned within the clarification chamber and an outlet end external of the tank; and
an aerator positioned within the aeration chamber.

18. The apparatus of claim 17, wherein the inclined partition is formed to have an inverted frustoconical shape.

19. The apparatus of claim 17, wherein the bottom of the tank has a center, and wherein the bottom of the tank has an inclined shape sloping downwardly toward the center.

20. The apparatus of claim 19, wherein the bottom of the tank has is formed to have an inverted frustoconical shape.

21. The apparatus of claim 19, wherein the bio-sludge outlet is proximate the center of the bottom of the tank.

22. The apparatus of claim 17, wherein the tank has a cylindrical shape.

23. The apparatus of claim 17, wherein the intake end of the effluent discharge outlet line is positioned proximate to and below the lower surface of the inclined partition.

24. The apparatus of claim 17, further comprising:
a bridge member disposed on portions of the peripheral edge of the tank;
a drive mechanism supported by the bridge;
a driven assembly coupled to the drive mechanism that includes:
an elongate shaft having a distal end, the shaft extending through the opening in the inclined partition such that the distal end of the shaft is spaced from the bottom of the tank;
at least one rake arm extending radially from the shaft; and,
at least one scraper blade depending from the rake arm for close sliding contact with at least a portion of the bottom of the tank.

25. The apparatus of claim 17, further comprising a second partition having a top edge, a spaced bottom edge, and a pair of opposing side edges extending from the top edge to the bottom edge thereof, the side edges of the second partition connected to portions of the side wall of the tank so that the top edge of the second partition is proximate the peripheral edge of the tank and the bottom edge of the second partition is spaced from the upper surface of the inclined partition, wherein the second partition and the side wall of the tank define an anoxic chamber within the upper aeration chamber of the tank.

26. The apparatus of claim 25, wherein the bottom edge of the second partition is spaced from the upper surface of the common partition a first distance and the aerator is spaced from the upper surface of the common partition a second distance, and wherein the second distance is greater than the first distance so that the bottom edge of the second partition extends below the aerator.

27. The apparatus of claim 25, wherein the wastewater inlet line opens into the anoxic chamber of the tank.

28. The apparatus of claim 27, further comprising:
a bio-sludge recirculation conduit having a first end in communication with the bio-sludge outlet and a second end in communication with the anoxic chamber; and
a pump operably connected to the bio-sludge recirculation conduit so that bio-sludge from the clarification chamber of the tank is passed into the anoxic chamber.

29. The apparatus of claim 28, wherein the bio-sludge recirculation line is in fluid communication with the wastewater inlet line.

30. The apparatus of claim 17, wherein the aerator is selected from a group consisting of a fine bubble diffuser, a coarse bubble diffuser, a jet aerator, an inductor aerator, a low speed mechanical aerator, a high speed mechanical aerator, and combinations thereof.

31. A system for treating wastewater having bio-solids therein, comprising:
a tank having a bottom, an upper aeration chamber, and a lower clarification chamber, the upper aeration chamber separated from the lower clarification chamber by a common inclined partition having an opening defined therein, the inclined partition opening into the clarification chamber near the bottom of the tank and allowing fluid communication between the upper aeration chamber and the lower clarification chamber, the bottom of the tank having a bio-sludge outlet for removal of settled bio-solids;
a wastewater inlet line opening into the aeration chamber;
an effluent discharge outlet line having an intake end positioned within the clarification chamber and an outlet end external of the tank; and
an aeration source positioned within the aeration chamber.

32. The system of claim 31 wherein the inclined partition is formed to have a frustoconical shape.

33. The system of claim 31, wherein the bottom of the tank has a center, and wherein the bottom of the tank is formed to have an inverted frustoconical shape sloping downwardly toward the center.

34. The system of claim 31, wherein the tank has an open top having a peripheral edge, further comprising:
- a bridge member supported on the peripheral edge of the tank;
- a drive mechanism supported by the bridge;
- a driven assembly coupled to the drive mechanism that includes:
  - a downwardly extending elongate shaft having a distal end, the shaft extending through the opening in the inclined partition such that the distal end of the shaft is spaced from the bottom of the tank;
  - at least one rake arm extending generally radially from the shaft; and,
  - at least one scraper blade depending from the rake arm for close sliding contact with at least a portion of the bottom of the tank.

35. The system of claim 31, wherein the tank has an open top having a peripheral edge and a side wall extending from the top to the bottom of the tank, further comprising an anoxic chamber defined within the aeration chamber by a second common partition having a top edge, an opposite bottom edge, and a pair of opposing side edges extending from the top edge to the bottom edge thereof, the side edges of the second partition connected to portions of the side wall of the tank so that the top edge of the second partition is proximate the peripheral edge of the tank and the bottom edge of the partition is spaced from an upper surface of the inclined partition, wherein the anoxic chamber is within the aeration chamber of the tank.

36. The system of claim 35, wherein the bottom edge of the second partition extends below the aeration source within the aeration chamber.

37. The system of claim 35, wherein the wastewater inlet line opens into the anoxic chamber of the tank.

38. The system of claim 37, further comprising:
- a bio-sludge recirculation conduit having a first end in communication with the bio-sludge outlet and a second end in communication with the anoxic chamber; and
- a pump operably connected to the bio-sludge recirculation conduit so that bio-sludge from the clarification chamber of the tank is passed into the anoxic chamber.

39. The system of claim 38, wherein the bio-sludge recirculation line is in fluid communication with the wastewater inlet line.

40. The system of claim 31, wherein the aeration source is selected from a group consisting of a fine bubble diffuser, a coarse bubble diffuser, a jet aerator, an inductor aerator, a low speed mechanical aerator, a high speed mechanical aerator, and combinations thereof.

41. The system of claim 31, wherein the intake end of the discharge outlet line is positioned adjacent, and below the inclined partition.

42. A method for treating wastewater comprising:
- providing a tank having a bottom, an upper aeration chamber, and a lower clarification chamber, the aeration chamber separated from the clarification chamber by a common inclined partition having an opening defined therein, the partition opening into the clarification chamber near the bottom of the tank allowing fluid communication between the aeration chamber and the clarification chamber, the bottom of the tank having a bio-sludge outlet in communication with the clarification chamber;
- suppling wastewater to the aeration chamber;
- aerating the wastewater within the aeration chamber;
- passing aerated wastewater though the inclined partition opening and into the clarification chamber;
- settling bio-solids within the clarification chamber to the bottom of the tank;
- removing effluent from the clarification chamber of the tank;
- removing settled bio-solids from the clarification chamber of the tank via the bio-sludge outlet of the tank; and
- supplying a portion of the removed settled bio-solids to the aeration chamber of the tank.

43. A system for treating wastewater having bio-solids therein, comprising:
- a tank having a bottom, an upper aeration chamber, and a lower clarification chamber, the upper aeration chamber separated from the lower clarification chamber by a common inclined partition having an opening defined therein, the inclined partition opening into the clarification chamber near the bottom of the tank and allowing fluid communication between the upper aeration chamber and the lower clarification chamber, the bottom of the tank having a bio-sludge outlet for removal of settled bio-solids;
- a wastewater inlet line opening into the aeration chamber;
- an effluent discharge outlet line having an intake end positioned within the clarification chamber and an outlet end external of the tank;
- a bio-sludge recirculation conduit having a first end in communication with the bio-sludge outlet and a second end opening into the aeration chamber of the treatment tank so that a portion of the bio-sludge removed from the clarification chamber of the tank is passed into the aeration chamber; and
- an aeration source positioned within the aeration chamber.

* * * * *